US012712661B2

(12) United States Patent
Li et al.

(10) Patent No.: US 12,712,661 B2
(45) Date of Patent: Aug. 18, 2026

(54) FORWARD ERROR CORRECTION CODE RATE SELECTION FOR A FOUNTAIN CODE SYSTEM

(71) Applicant: QUALCOMM Incorporated, San Diego, CA (US)

(72) Inventors: Jian Li, Shanghai (CN); Changlong Xu, Beijing (CN); Kangqi Liu, San Diego, CA (US); Liangming Wu, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 372 days.

(21) Appl. No.: 18/252,648

(22) PCT Filed: Jan. 19, 2021

(86) PCT No.: PCT/CN2021/072609

§ 371 (c)(1),
(2) Date: May 11, 2023

(87) PCT Pub. No.: WO2022/155764

PCT Pub. Date: Jul. 28, 2022

(65) Prior Publication Data

US 2024/0014921 A1 Jan. 11, 2024

(51) Int. Cl.
*H04L 1/00* (2006.01)

(52) U.S. Cl.
CPC .......... *H04L 1/0002* (2013.01); *H04L 1/0026* (2013.01); *H04L 1/0041* (2013.01)

(58) Field of Classification Search
CPC ... H04L 1/0002; H04L 1/0026; H04L 1/0041; H04L 1/0016; H04L 1/0065
See application file for complete search history.

(56) References Cited

U.S. PATENT DOCUMENTS

2006/0159120 A1* 7/2006 KIm .................... H04L 1/0618 370/465
2011/0243052 A1* 10/2011 Alay .................... H04L 1/0002 370/312

(Continued)

OTHER PUBLICATIONS

Berger C.R., et al., "Optimizing Joint Erasure-and Error-Correction Coding for Wireless Packet Transmissions," IEEE Transactions on Wireless Communications, IEEE Service Center, Piscataway, NJ, US, vol. 7, No. 11, Nov. 1, 2008 (Nov. 1, 2008), pp. 4586-4595, XP011238926, ISSN: 1536-1276, DOI: 10.1109/T-WC.2008.070581, the whole document.

(Continued)

*Primary Examiner* — Moo Jeong
(74) *Attorney, Agent, or Firm* — Loza & Loza, LLP

(57) ABSTRACT

Aspects of the present disclosure relate to selection of a coding rate for forward error correction coding associated with Fountain code encoding. According to some aspects, a wireless device may determine a plurality of block error rates associated with a channel between the wireless device and a second device, the plurality of block error rates being associated with a plurality of coding rates. The wireless device may select a coding rate from the plurality of coding rates for forward error correction coding based on the plurality of block error rates and the plurality of coding rates. The wireless device may encode a source data packet using a Fountain code to produce a codeword, and perform the forward error correction coding on the codeword based on the selected coding rate to produce a transmit signal. The wireless device may transmit the transmit signal to the second device.

27 Claims, 10 Drawing Sheets

Table 2: Optimal coding rates for various channel quality values

| | Optimal Coding Rate |
|---|---|
| **CQV1** | $R_1$ |
| **CQV2** | $R_1$ |
| **CQV3** | $R_2$ |
| **CQV4** | $R_2$ |
| ... | ... |
| **CQV28** | $R_{14}$ |
| **CQV29** | $R_{15}$ |
| **CQV30** | $R_{15}$ |

(56) References Cited

U.S. PATENT DOCUMENTS

| | | | | |
|---|---|---|---|---|
| 2014/0064097 | A1 | 3/2014 | Gadat et al. | |
| 2014/0157092 | A1* | 6/2014 | Vojcic | H03M 13/356 714/776 |
| 2014/0169261 | A1* | 6/2014 | Ming | H04W 88/04 370/315 |
| 2015/0139125 | A1* | 5/2015 | Bharadwaj | H04W 72/563 370/329 |
| 2017/0170925 | A1* | 6/2017 | Xu | H04L 1/0065 |
| 2017/0207881 | A1* | 7/2017 | Shen | H03M 13/353 |
| 2021/0242960 | A1* | 8/2021 | Li | H04L 1/0026 |
| 2021/0266994 | A1* | 8/2021 | Li | H04W 76/14 |
| 2022/0123871 | A1* | 4/2022 | Kimura | H04L 1/1864 |

OTHER PUBLICATIONS

Chen X., et al., "PHY Modulation/Rate Control for Fountain Codes in 802.11a/g WLANs," Physical Communication, vol. 9, Dec. 1, 2013 (Dec. 1, 2013), pp. 135-144, XP055811346, Amsterdam, NL ISSN: 1874-4907, DOI: 10.1016/j.phycom.2012.12.003, Sections I-IV.

International Search Report and Written Opinion—PCT/CN2021/072609—ISA/EPO—Jun. 21, 2021.

* cited by examiner

Table 1: BLERs for various combinations of channel quality values and code rates

| | $R_1$ | $R_2$ | … | $R_{14}$ | $R_{15}$ |
|---|---|---|---|---|---|
| **CQV1** | $P_1$ for CQV1 | $P_2$ for CQV1 | … | $P_{14}$ for CQV1 | $P_{15}$ for CQV1 |
| **CQV2** | $P_1$ for CQV2 | $P_2$ for CQV2 | … | $P_{14}$ for CQV2 | $P_{15}$ for CQV2 |
| **…** | … | … | … | … | … |
| **CQV30** | $P_1$ for CQV30 | $P_2$ for CQV30 | … | $P_{14}$ for CQV30 | $P_{15}$ for CQV30 |

FIG. 5A

Table 2: Optimal coding rates for various channel quality values

| | Optimal Coding Rate |
|---|---|
| **CQV1** | $R_1$ |
| **CQV2** | $R_1$ |
| **CQV3** | $R_2$ |
| **CQV4** | $R_2$ |
| **…** | … |
| **CQV28** | $R_{14}$ |
| **CQV29** | $R_{15}$ |
| **CQV30** | $R_{15}$ |

FIG. 5B

FORWARD ERROR CORRECTION CODE RATE SELECTION FOR A FOUNTAIN CODE SYSTEM

CROSS-REFERENCE TO RELATED APPLICATION

This application is the U.S. national stage of PCT patent application number PCT/CN2021/072609 filed on Jan. 19, 2021.

TECHNICAL FIELD

The technology discussed below relates generally to wireless communication systems, and more particularly, to forward error correction associated with Fountain codes.

INTRODUCTION

In wireless communication, source packets at a wireless device are often encoded prior to transmission to another device. Among various encoding algorithms, Fountain codes allow a limitless number of packets to be transmitted until a receiving device receives sufficient packets to recover the original packets. For example, when Fountain codes are used to encode original packets, the original packets can be recovered in a receiver device as long as the number of received packets at the receiver device is larger than the number of the original packets. As a part of an encoding process prior to transmitting a signal, an additional forward error correction (FEC) code may be applied after the Fountain code.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method of wireless communication by a wireless device is disclosed. The method includes determining a plurality of block error rates associated with a channel between the wireless device and a second device, the plurality of block error rates being associated with a plurality of coding rates, selecting a coding rate from the plurality of coding rates for forward error correction coding based on the plurality of block error rates and the plurality of coding rates, encoding a source data packet using a Fountain code of a plurality of Fountain codes to produce a codeword, performing the forward error correction coding on the codeword based on the selected coding rate to produce a transmit signal, and transmitting the transmit signal to the second device.

In another example, a wireless device for wireless communication is disclosed. The wireless device includes at least one processor, a transceiver communicatively coupled to the at least one processor, and a memory communicatively coupled to the at least one processor. The at least one processor may be configured to determine a plurality of block error rates associated with a channel between the wireless device and a second device, the plurality of block error rates being associated with a plurality of coding rates, select a coding rate from the plurality of coding rates for forward error correction coding based on the plurality of block error rates and the plurality of coding rates, encode a source data packet using a Fountain code of a plurality of Fountain codes to produce a codeword, perform the forward error correction coding on the codeword based on the selected coding rate to produce a transmit signal, and transmit the transmit signal to the second device.

In another example, a non-transitory computer-readable storage medium having instructions for a wireless device thereon may be disclosed. The instructions, when executed by a processing circuit, cause the processing circuit to determine a plurality of block error rates associated with a channel between the wireless device and a second device, the plurality of block error rates being associated with a plurality of coding rates, select a coding rate from the plurality of coding rates for forward error correction coding based on the plurality of block error rates and the plurality of coding rates, encode a source data packet using a Fountain code of a plurality of Fountain codes to produce a codeword, perform the forward error correction coding on the codeword based on the selected coding rate to produce a transmit signal, and transmit the transmit signal to the second device.

In a further example, a wireless device for wireless communication may be disclosed. The wireless device includes means for determining a plurality of block error rates associated with a channel between the wireless device and a second device, the plurality of block error rates being associated with a plurality of coding rates, means for selecting a coding rate from the plurality of coding rates for forward error correction coding based on the plurality of block error rates and the plurality of coding rates, means for encoding a source data packet using a Fountain code of a plurality of Fountain codes to produce a codeword, means for performing the forward error correction coding on the codeword based on the selected coding rate to produce a transmit signal, and means for transmitting the transmit signal to the second device.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 5A is an example table that shows block error rates for various combinations of channel quality values and code rates, according to some aspects.

FIG. 5B is an example table that shows optimal coding rates for various channel quality values, according to some aspects.

DETAILED DESCRIPTION

Figure 1:
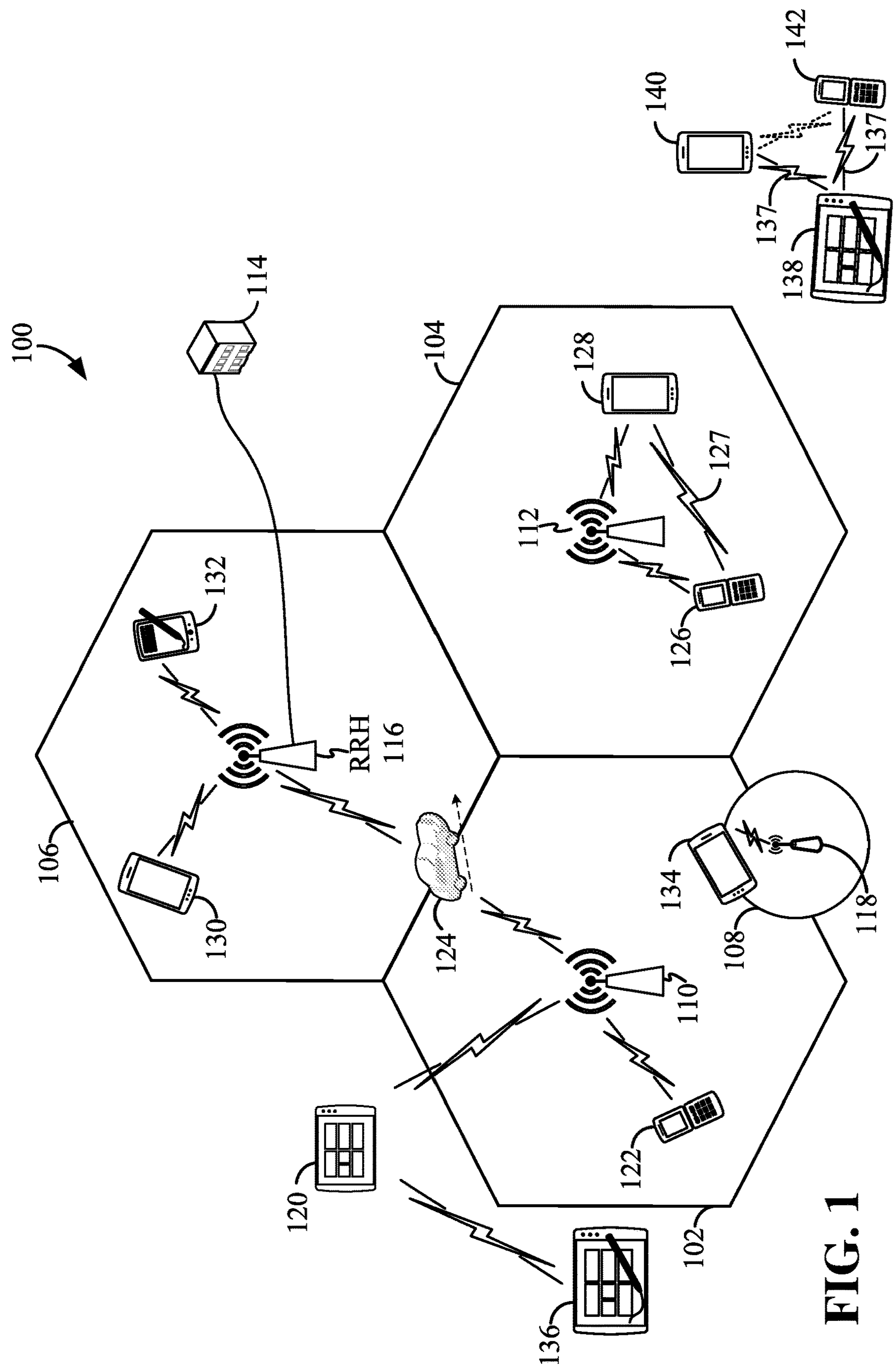
FIG. 1 is a diagram illustrating an example of a radio access network according to some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the disclosure relate to selecting a coding rate for forward error correction coding associated with Fountain codes. In some examples, source packets may be encoded using a Fountain code and then forward error correction coding may be applied to generate transmit packets to transmit to a receiving wireless communication device. Some aspects of the disclosure provides an approach to select an optimal coding rate for the forward error correction coding out of available coding rates. In an aspect, a coding rate for the forward error correction coding may be selected based on block error rates associated with a communication channel and the available coding rates that are associated with the block error rates.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to 3$^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

In FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a mobile device 120, which may be configured to function as a base station. That is, in some examples, a cell may not necessarily be stationary, and the geographic area of the cell may move according to the location of a mobile base station such as the mobile device 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the radio access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In another example, a mobile network node (e.g., mobile device 120) may be configured to function as a UE. For example, the mobile device 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality. The RAN 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSS s) and unified Physical Broadcast Channels (PBCH)). The UEs 122, 124, 126, 128, 130, and 132 may receive the unified synchronization signals, derive the carrier frequency and radio frame timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the RAN 100. Each of the cells may measure a strength of the pilot signal, and the RAN (e.g., one or more of the base stations 110 and 114/116 and/or a central node within the core network) may determine a serving cell for the UE 124. As the UE 124 moves through the RAN 100, the network may continue to monitor the uplink pilot signal transmitted by the UE 124. When the signal strength or quality of the pilot signal measured by a neighboring cell exceeds that of the signal strength or quality measured by the serving cell, the RAN 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks can enable uplink-based mobility framework and improve efficiency of both the UE and the network. Efficiencies may be brought about because the number of mobility messages that need to be exchanged between the UE and the network may be reduced.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using peer to peer (P2P) or sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a P2P network, a device-to-device (D2D) network, vehicle-to-vehicle (V2V) network, a vehicle-to-everything (V2X), a mesh network, or other suitable direct link network.

Fountain codes are rateless codes in the sense that a potentially limitless sequence of coded packets may be generated from a given set of source packets. For example, each Fountain code may not have a limit in length and thus may not have a fixed length. Hence, for example, a transmitter device may transmit packets encoded using a Fountain code indefinitely, until a receiver device acknowledges that all packets have been received. Generally, when a Fountain code is used to encode source packets to be transmitted, the transmitted packets can be recovered in a receiver device as long as the number of received packets at the receiver device is larger than the number of the source packets, regardless of which packets are received. A Luby transform (LT) code and a Raptor code are different types of Fountain codes. A Raptor code may be based on a low density parity check (LDPC) code and an LT code. Fountain codes have been adopted wireless communication. For example, in LTE, the Raptor code has been applied for a multimedia broadcast multicast service (MBMS).

The principle of Fountain codes is explained as follows. At a transmitter device, given that the number of source packets is K, the source packets may be encoded using a generator matrix having K rows, for the Fountain codes. The generator matrix may not have a fixed number of columns and thus may have an unlimited number of columns. For example, the source packets s k may be encoded using a generator matrix $G_{kj}$, where k ranges from 1 to K, to generate j-th transmit packet. Hence, the j-th transmit packet $p_j$ may be expressed as follows.

$$p_j = \sum_{k=1}^{K} s_k G_{kj} \quad \text{(Equation 1)}$$

The transmitter transmits the transmit packets indefinitely. At a receiver device, receive packets may be received after losing one or more transmit packets from the transmit packets transmitted from the transmitter. N receive packets may be received from the transmit packets, where N is greater than K. A receive matrix may be obtained based on the receive packets, and thus may be considered a sub-matrix of the generator matrix. If the receive matrix is invertible, then the receiver device can recover the source packets from the receive packets. In an example where N receive packets may be decoded to recover packets of the source packets, the recovered source packets may be obtained by decoding the receive packets $p_n$ based on an inverse matrix $$G_{nk}^{-1}$$

of a receive matrix $G_{nk}$, where n ranges from 1 to N. Therefore, a condition for obtaining the recovered source packets is that the receive matrix $G_{nk}$ according to the receive packets is an invertible matrix, or that a rank of the receive matrix $G_{nk}$ is K. Given that N receive packets are received from the transmit packets, the k-th recovered source packet $d_k$ may be expressed as follows, where k may range from 1 to K.

$$d_k = \sum_{n=1}^{N} p_n G_{nk}^{-1} \quad \text{(Equation 2)}$$

To successfully recover the source packets, N needs to be larger than K. For example, if N=K, there may be a probability of approximately 50% to recover all of the K source packets. If N is greater than K, a difference between N and K may be considered a number of overhead packets. If N is greater that K by two overhead packets, there may be probability of approximately 75% to recover all of the K source packets. A larger number of overhead packets may increase the probability to recover all of K source packets.

Figure 2:
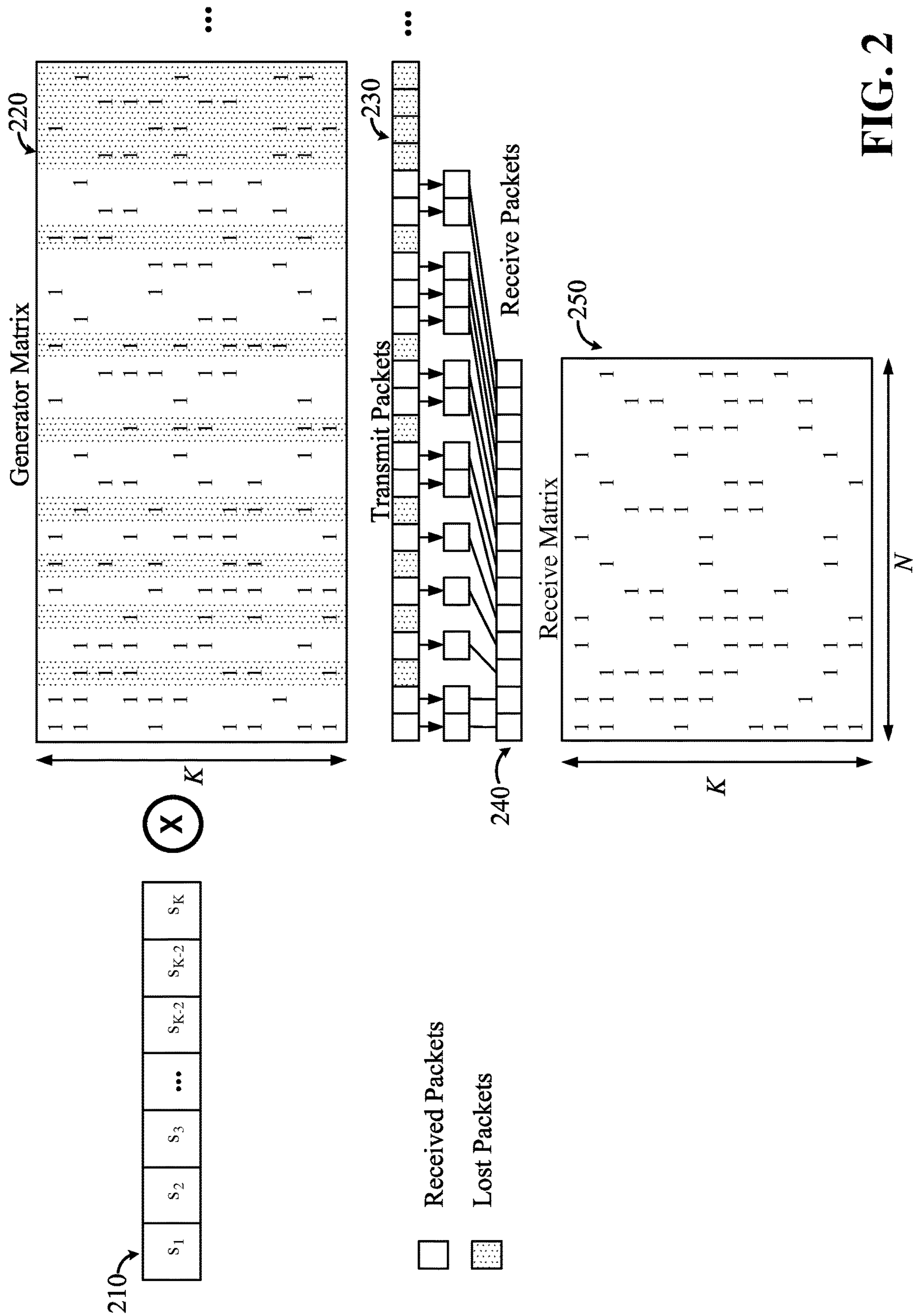
FIG. 2 is an example diagram of encoding for the Fountain codes, according to some aspects.

FIG. 2 is an example diagram of a Fountain code, according to some aspects. As illustrated in FIG. 2, a transmitter device may encode source packets 210 by performing an XOR operation with a generator matrix 220 of the Fountain code, to generate transmit packets 230. In the example shown in FIG. 2, a number of source packets is K, and thus the generator matrix 220 has K rows. As shown in FIG. 2, the generator matrix 220 is not limited in a number of columns, and thus a number of the transmit packets may also be indefinite.

In FIG. 2, at a receiver device, a subset of the transmit packets may be received, which may be referred to herein as receive packets, while the other transmit packets are lost (e.g., due to noise in a communication channel). In the example of FIG. 2, N receive packets 240 are received by the receiver device. Based on the receive packets 240, the receiver device may generate a receive matrix 250 having K rows and N columns, which may be considered a subset of the generator matrix 220. In the example of FIG. 2, because the shaded portion of the generator matrix 220 corresponds to lost packets, the receive matrix 250 corresponds to the non-shaded portion of the generator matrix 220. If N is greater than K, there is a high probability that the receiver device can recover the source packets successfully.

Figure 3:
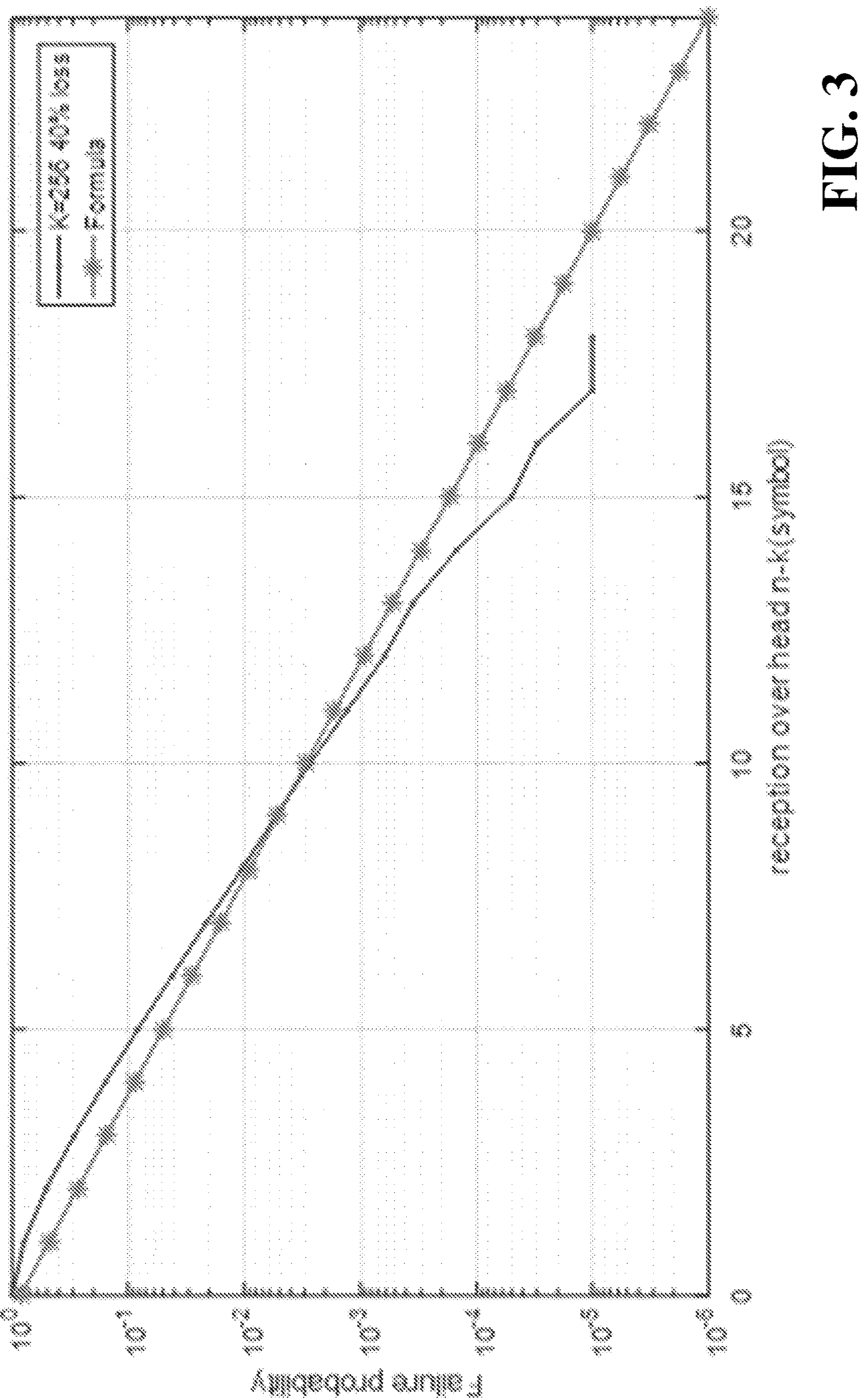
FIG. 3 is an example diagram illustrating a failure probability with respect to a number of overhead packets, according to some aspects.

FIG. 3 is an example diagram illustrating a failure probability with respect to a number of overhead packets, according to some aspects. As discussed above, a larger number of overhead packets may increase the probability to recover all of the K source packets. For example, if a Raptor code, which is a type of the Fountain code, is used, a failure probability (e.g., a probability to fail to successfully decode K source packets from N receive packets) may be expressed as follows, where N−K represents a number of overhead packets.

$$P_f(N, K) = \begin{cases} 1 & \text{if } N < K \\ 0.85 \times 0.567^{N-K} & \text{if } N \geq K \end{cases} \quad \text{(Equation 3)}$$

Hence, the failure probability depends only on the number of overhead packets. Further, the above formula indicates that if N is greater than or equal to K, the failure probability decreases as the number of overhead packets increases. As illustrated in FIG. 3, results from both the above formula and a computer simulation indicate that the failure probability decreases as the number of overhead packet increases.

Figure 4:
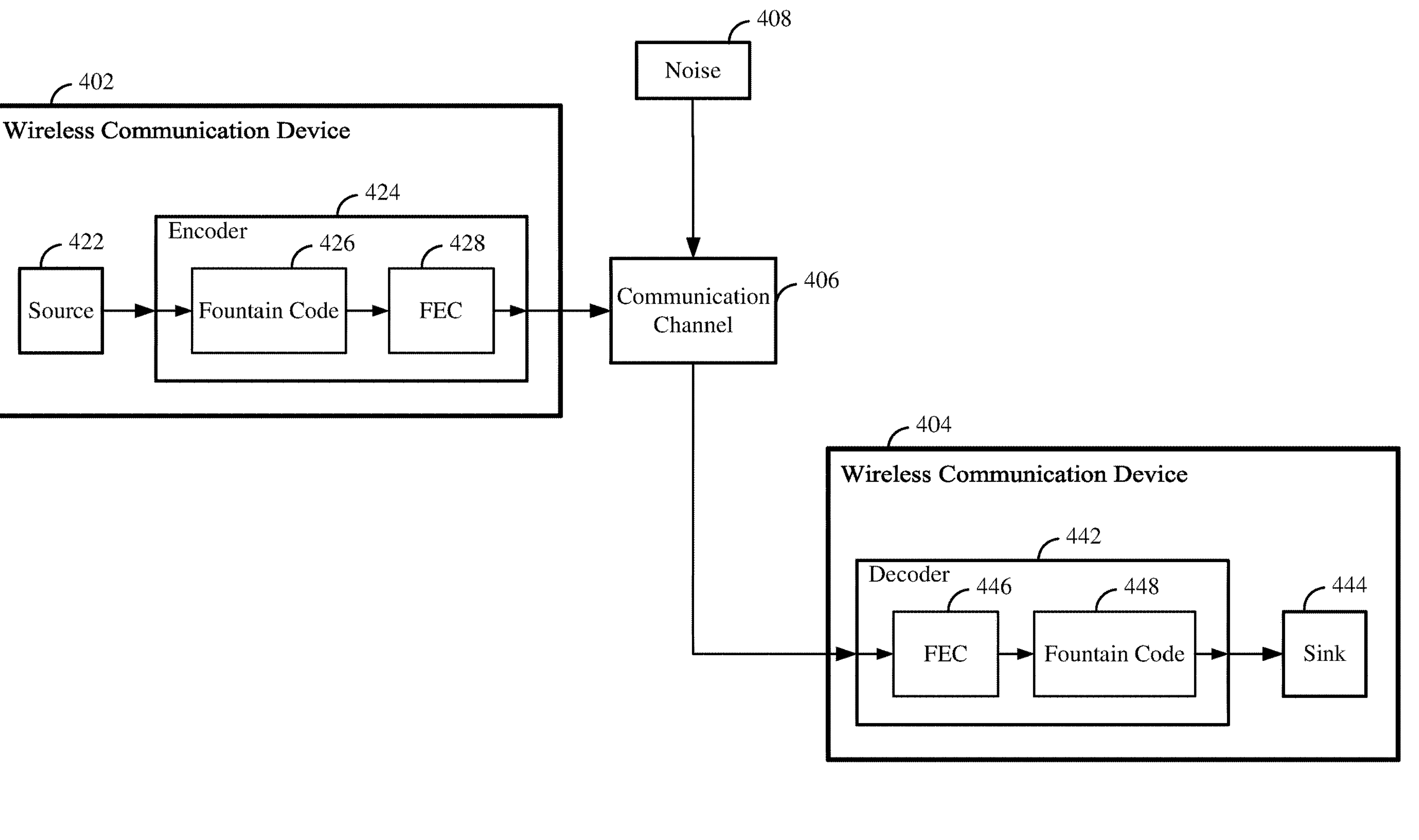
FIG. 4 is a schematic illustration of wireless communication between a first wireless communication device and a second wireless communication device.

FIG. 4 is a schematic illustration of wireless communication between a first wireless communication device 402 and a second wireless communication device 404. Each of the wireless communication devices 402 and 404 may be a user equipment (UE), a base station, or any other suitable apparatus or means for wireless communication. In the illustrated example, a source 422 within the first wireless communication device 402 transmits a digital message over a communication channel 406 (e.g., a wireless channel) to a sink 444 in the second wireless communication device 404. To provide for reliable communication of the digital message, it is usually beneficial to take into account the noise 408 that affects the communication channel 406.

The source 422 provides source packets to an encoder 424 of the first wireless communication device 402. In the encoder 424, a Fountain code component 426 encodes the source packets to produce codewords. A forward error correction (FEC) component 428 of the encoder 424 then applies a forward error correction code, such as LDPC, to the codewords to generate transmit packets (e.g., encoded transmit packets). For example, the coded symbols from the Fountain code component 426 may further be encoded by the FEC component 428 in a physical (PHY) layer. Subsequently, the first wireless communication device 402 transmits the transmit packets, via the communication channel 406.

Some of the transmit packets may be lost in the communication channel 406, e.g., due to the noise 408. The transmit packets that are successfully received by the second wireless communication device 404 may be referred to as receive packets. The receive packets are first decoded using a decoder 442. The decoder 442 includes a FEC component 446 that decodes the forward error correction coding applied to the receive packets to produce the codewords, and a Fountain code component 448 that decodes the codewords after the forward error correction decoding. After the decoding by the decoder 442, the source packets may be recovered and provided to the sink 444.

I In various aspects of the disclosure, to maximize the overall throughput, the first wireless communication device 402 may be configured to select a particular FEC coding rate to utilize with Fountain codes. According to some aspects of the disclosure, the FEC coding rate to be used in conjunction with the Fountain codes may be selected based on block error rates and available coding rates. An approach to selection of the FEC coding rate may be derived from the following analysis.

In particular, considering two different schemes with different block error rates and different modulation and coding scheme (MCS) coding rates (MCS rates), the following analysis may be performed. Assuming that a first scheme (scheme 1) has an MCS rate of $R_1$ and a block error rate (BLER) of $P_1$, and a Fountain Code transmits N packets using the first scheme, then a second scheme (scheme 2) having an MCS rate of $R_2$ and a BLER of $P_2$ may cause the Fountain code to transmit $N*R_2/R_1$ packets, given that both the first scheme and the second scheme uses the same resources and the information size is the same for the both schemes. Then, the number of correctly received codewords for each scheme may be expressed follows.

Scheme 1:

$$N*(1-P_1) \quad \text{(Equation 4)}$$

Scheme 2:

$$N*\frac{R_2}{R_1}*(1-P_2) \quad \text{(Equation 5)}$$

Considering that the number of source packets for the Fountain code is K, the extent that the number of correctly received codewords exceeds K may be directly proportionate to the probability to recover all of the information. The second scheme may be considered to have a higher probability to recover all the information than the first scheme if the following holds:

$$N*\frac{R_2}{R_1}*(1-P_2)-K>N*(1-P_1)-K>0, \quad \text{(Equation 6)}$$

or, simply $$(1-P_2)^*R_2>(1-P_1)^*R_1. \quad \text{(Equation 7)}$$

Hence, if $(1-P_2)*R_2>(1-P_1)*R_1$, the second scheme may be considered to be better than the first scheme. From this analysis, it can be deduced that a scheme that provides a higher value of $(1-P_i)*R_i$ than other schemes may provide the best results, where $R_i$ is an i-th coding rate, $P_i$ is i-th block error rate that corresponds to $R_i$, and i ranges from 0 to M, with M being an integer. For example, if $(1-P_5)*R_5$ provides a highest value among $(1-P_i)*R_i$ values of different schemes, it can be said that the 5th scheme provides the best results. As used herein, i may represents a scheme, such as an MCS rate. Thus, if M is 15, $R_i$ ranges from $R_1$ to $R_{15}$ and $P_i$ ranges from $P_1$ to $P_{15}$ respectively corresponding to $R_1$ to $R_{15}$.

Hence, according to some aspects of the disclosure, a first wireless device may select a coding rate among available coding rates for forward error correction coding based on block error rates and coding rates of different scenarios, perform the forward error correction coding based on the selected coding rate after performing Fountain code encoding, to produce a transmit signal, and then transmit the transmit signal to a second wireless device. The block error rates may be the block error rates associated with a communication channel between the first (transmitting) wireless device and the second (receiving) wireless device. For example, to select the coding rate among available coding rates, the first wireless device may select a coding rate that maximizes a metric $(1-P_i)*R_i$ among available coding rates, where $R_i$ is an i-th coding rate of the available coding rates and $P_i$ is an i-th block error rate of the block error rates corresponding to the i-th coding rate $R_i$. In an aspect, the available coding rates may be based on MCS index values. For example, the first wireless device may be the first wireless communication device 402 and the second wireless device may be the second wireless communication device 404.

The first wireless device may determine the block error rates associated with the communication channel between the first wireless device and the second wireless device, where the block error rates are associated with the coding rates. In an aspect, the coding rates may be MCS coding rates.

In an aspect, to determine the block error rates, the first wireless device may receive, from the second wireless device, the block error rates determined based on the coding rates. For example, the second wireless device may determine the block error rates based on the coding rates, and may transmit the block error rates to the first wireless device. In this example, the first wireless device may select a coding rate among available coding rates that maximizes the metric $(1-P_i)*R_i$, based on the block error rates received from the second wireless device and the available coding rates respectively associated with such block error rates.

In an aspect, to determine the block error rates, the first wireless device may determine multiple channel quality values (CQVs) associated with the communication channel for each coding rate of the coding rates. In this aspect, the first wireless device may select the coding rate further based on the channel quality values. In an aspect, the channel quality values may include channel state information (CSI) feedback values (e.g., channel quality indicator (CQI) values) and/or signal-to-interference-plus-noise ratio (SINR) values.

In an aspect, the block error rates may be determined by using offline simulations, based on the channel quality values and the coding rates. In an example, during the offline simulations, the first wireless device may receive CSI feedback values from the second wireless device for each coding rate of the available coding rates, thereby determining the channel quality values. In an offline simulation example where the channel quality values include SINR values, the first wireless device may estimate the SINR values of the communication channel based on a reference signal or data from the second device or the first wireless device may measure the SINR values at the first wireless device. Then, block error rates for different combinations of channel quality values and coding rates may be determined.

In an aspect, the block error rates may include multiple sets of block error rates, where the multiple sets respectively correspond to channel quality values. In this aspect, block error rates of each set of the multiple sets may be respectively associated with coding rates and may be determined based respectively on the coding rates and a corresponding channel quality value of the multiple channel quality values. For example, if there are 15 available coding rates $R_1$-$R_{15}$ (e.g., coding rates of 15 MCSs) and 30 channel quality values (CQV1-CQV30) are determined for each coding rate, block error rates in a first set may be $P_1$ values respectively for CQV1-CQV30, block error rates in a second set may be P2 values respectively for CQV1-CQV30, and thus block error rates in an i-th set may be $P_i$ values respectively for CQV1-CQV30. FIG. 5A is an example table that shows block error rates for various combinations of channel quality values and code rates, according to some aspects. Referring to FIG. 5A, Table 1 illustrates an example lookup table that can be used to deduce the $P_i$ values for different CQVs, based different CQV and $R_i$ combinations.

In an aspect, the first wireless device may determine a plurality of optimal coding rates respectively for the multiple channel quality values. For example, each optimal coding rate for a corresponding channel quality value may be a coding rate that maximizes the metric $(1-P_i)*R_i$, based on the block error rates for the corresponding channel quality value and the available coding rates. In this aspect, when the first wireless device determines a channel quality value associated with the communication channel (e.g., by receiving the channel quality value from the second device), then the first wireless device may select one of the optimal coding rates that corresponds with the determined channel quality value for the forward error correction coding. For example, based on Table 1 illustrated in FIG. 5A, the first wireless device may determine an optimal coding rate for each CQV value. For example, the first wireless device may determine that the optimal coding rate is $R_1$ for COV1 and $R_{15}$ for COV2. FIG. 5B is an example table that shows optimal coding rates for various channel quality values, according to some aspects. Referring to FIG. 5B, Table 2 illustrates an example lookup table that can be used to determine an optimal coding rate for a particular channel quality value.

In an aspect, the first wireless device may deduce a block error rate $P_i$ based on feedback (e.g., hybrid automatic repeat request (HARQ) feedback) from the second wireless device, and may tune a coding rate $R_i$ with $P_i$ to select the coding rate for the forward error correction coding. In this aspect, the first wireless device may transmit, to the second wireless device, multiple signals using each coding rate of the available coding rates, and receive feedback signals from the second wireless device in response to the multiple signals transmitted for each coding rate. Subsequently, to determine the block error rates, the first wireless device may determine each block error rate for a corresponding coding rate of the available coding rates based on the feedback signals for the corresponding coding rate. In an example, the first wireless device may select a coding rate among available coding rates that maximizes the metric $(1-P_i)*R_i$, based on the block error rates determined based on the feedback signals and the available coding rates respectively associated with such block error rates. In an aspect, each of the feedback signals may indicate either an acknowledgement (ACK) or a negative acknowledgement (NACK). For example, for each coding rate, if the first wireless device transmitted one hundred transmit signals and respectively received one hundred feedback signals in response, the first wireless device may determine a block error rate for a corresponding coding rate based on a number of ACKs and/or a number of NACKs received in the feedback signals.

Figure 6A:
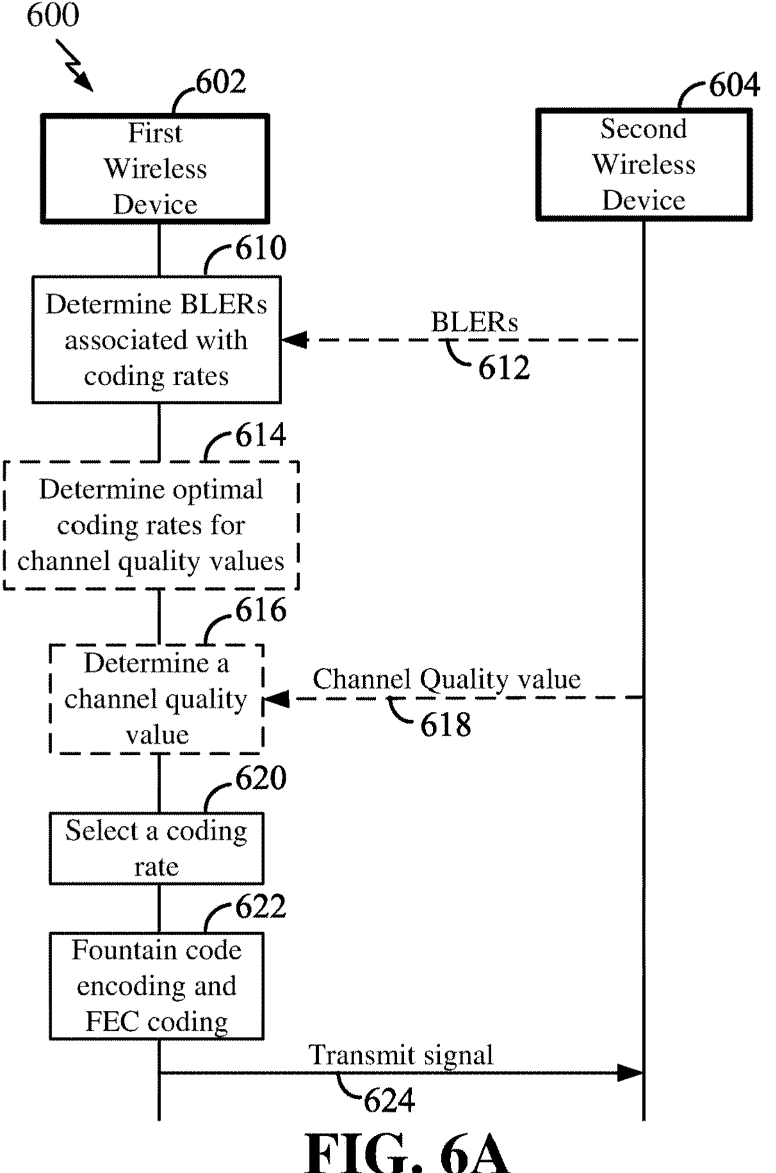
FIGS. 6A and 6B are example diagrams illustrating features involving two wireless devices, according to some aspects.
Figure 6B:
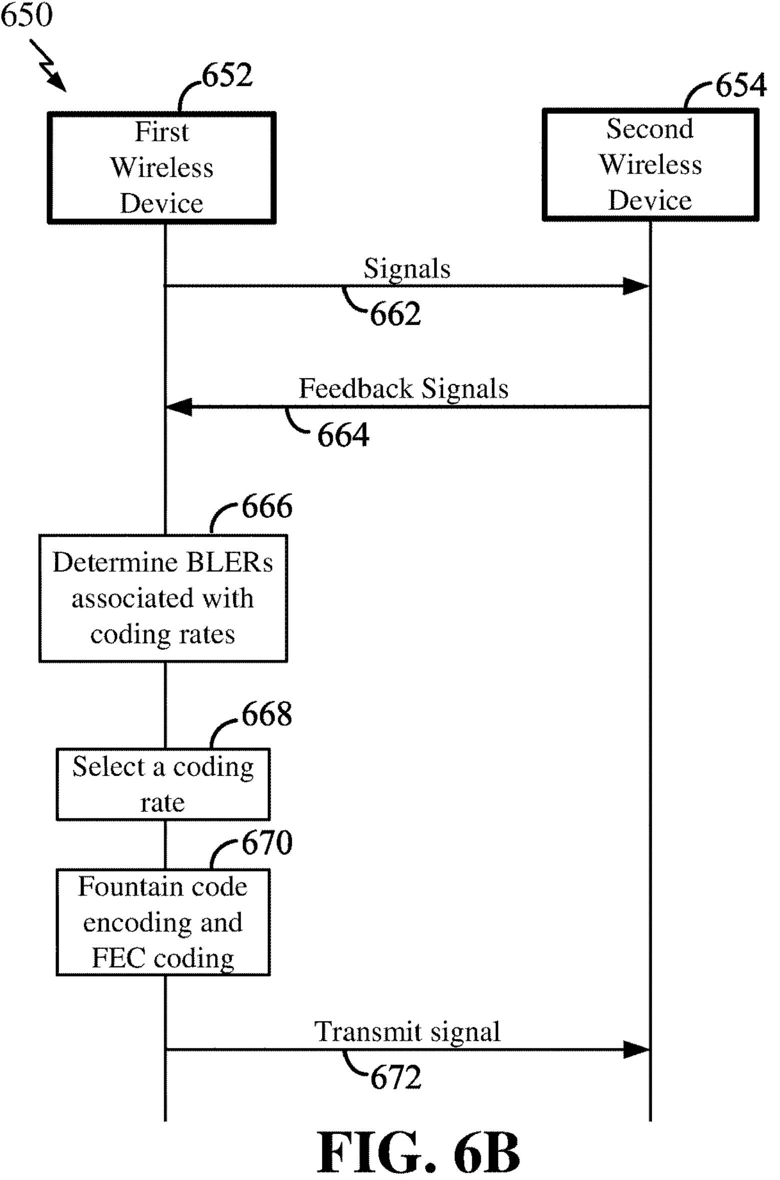

FIGS. 6A and 6B are example diagrams illustrating features involving two wireless devices, according to some aspects. Referring to FIG. 6A, the example diagram 600 illustrates features involving a first wireless device 602 and a second wireless device 604. The first wireless device 602 may be any of the UEs or wireless devices illustrated in FIGS. 1 and 4. The second wireless device 604 may be any of the UEs or wireless devices illustrated in FIGS. 1 and 4.

At 610, the first wireless device 602 may determine block error rates associated with a communication channel between the first wireless device 602 and the second wireless device 604, where the block error rates are associated with multiple coding rates.

In an aspect, at 612, to determine the block error rates, the first wireless device 602 may receive the block error rates determined based on the coding rates from the second wireless device 604. In this aspect, the features of 614 and 616 may not be skipped, and at 620, the first wireless device 602 may select a coding rate among the multiple coding rates that maximizes the metric $(1-P_i)*R_i$, based on the block error rates received from the second wireless device 604 and the multiple coding rates respectively associated with such block error rates.

In an aspect, at 612, to determine the block error rates, the first wireless device 602 may determine multiple channel quality values associated with the communication channel for each coding rate of the coding rates. In this aspect, the block error rates may include multiple sets of block error rates, where the multiple sets respectively correspond to channel quality values. For example, the first wireless device 602 may generate a lookup table that can be used to deduce block error rates for different combinations of the channel quality values and the multiple coding rates, such as the lookup table illustrated as Table 1 of FIG. 5A. Further, in this aspect, at 614, the first wireless device 602 may determine optimal coding rates respectively for the multiple channel quality values, e.g., based on the lookup table. For example, each optimal coding rate for a corresponding channel quality value may be a coding rate that maximizes the metric $(1-P_i)*R_i$, based on the block error rates for the corresponding channel quality value and the available coding rates. In an example, the first wireless device 602 may generate a lookup table that lists the optimal coding rates for different channel quality values, such as the lookup table illustrated as Table 2 of FIG. 5B. Subsequently, at 616, the first wireless device 602 may determine a current channel quality value associated with the communication channel. In an aspect, the current channel quality value may be received from the second wireless device 604. At 620, the first wireless device 602 may select a coding rate by selecting one of the plurality optimal coding rates that corresponds with the current channel quality value.

At 622, on the source packets, the first wireless device 602 may perform the Fountain code encoding and may also perform the forward error correction coding based on the selected coding rate, to generate a transmit signal. At 624, the first wireless device 602 may transmit the transmit signal to the second wireless device 604.

Referring to FIG. 6B, the example diagram 650 illustrates features involving a wireless device 652 and a second wireless device 654. The wireless device 652 may be any of the UEs or wireless devices illustrated in FIGS. 1 and 4. The second wireless device 654 may be any of the UEs or wireless devices illustrated in FIGS. 1 and 4.

At 662, the wireless device 652 may transmit multiple signals to the second wireless device 654 using each coding rate of the multiple coding rates. At 624, the wireless device 652 may receive feedback signals from the second wireless device 654 in response to the multiple signals transmitted for each coding rate.

At 666, the wireless device 652 may determine block error rates associated with a communication channel between the first wireless device 602 and the second wireless device 604, where the wireless device 652 may determine each block error rate for a corresponding coding rate of the available coding rates based on the feedback signals for the corresponding coding rate received from the second wireless device 654.

At 668, the wireless device 652 may select a coding rate among the multiple coding rates that maximizes the metric $(1-P_i)*R_i$, based on the block error rates determined based on the feedback signals and the available coding rates respectively associated with such block error rates.

At 670, on the source packets, the wireless device 652 may perform the Fountain code encoding and may also perform the forward error correction coding based on the selected coding rate, to generate a transmit signal. At 672, the first wireless device 602 may transmit the transmit signal to the second wireless device 654.

Figure 7:
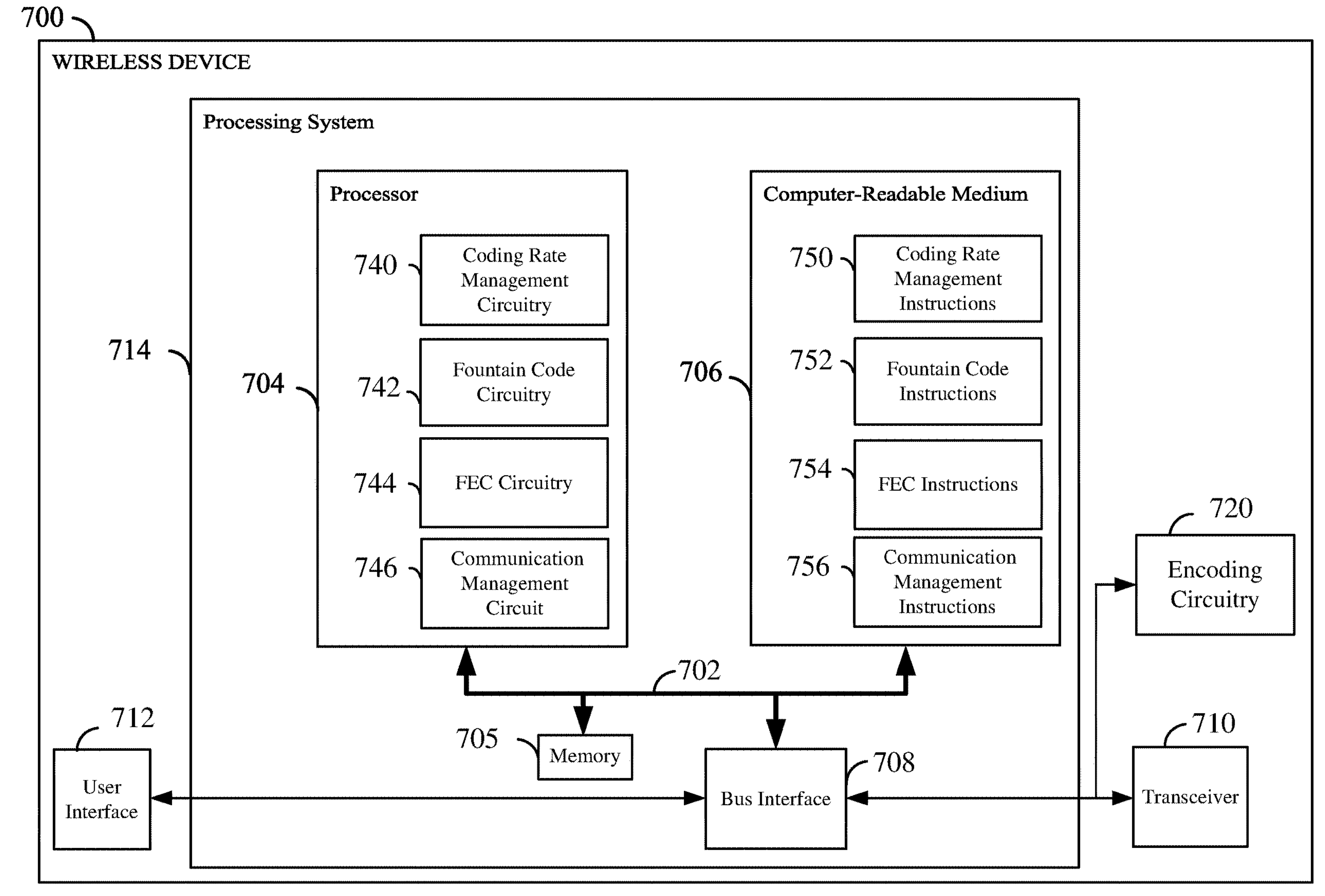
FIG. 7 is a block diagram illustrating an example of a hardware implementation for a wireless device employing a processing system according to some aspects.

FIG. 7 is a block diagram illustrating an example of a hardware implementation for a wireless device 700 employing a processing system 614. For example, the wireless device 700 may be a wireless communication device such as a UE, as illustrated in any one or more of FIGS. 1, 4, and/or 6.

The wireless device 700 may be implemented with a processing system 714 that includes one or more processors 704. Examples of processors 704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless device 700 may be configured to perform any one or more of the functions described herein. That is, the processor 704, as utilized in the wireless device 700, may be used to implement any one or more of the processes and procedures described below and illustrated in FIGS. 8, 9, and 10.

In this example, the processing system 714 may be implemented with a bus architecture, represented generally by the bus 702. The bus 702 may include any number of interconnecting buses and bridges depending on the specific application of the processing system 714 and the overall design constraints. The bus 702 communicatively couples together various circuits including one or more processors (represented generally by the processor 704), a memory 705, and computer-readable media (represented generally by the computer-readable storage medium 706). The bus 702 may also link various other circuits such as timing sources, peripherals, voltage regulators, and power management circuits, which are well known in the art, and therefore, will not be described any further. A bus interface 708 provides an interface between the bus 702 and a transceiver 710. The transceiver 710 provides a communication interface or means for communicating with various other apparatus over a transmission medium. Depending upon the nature of the apparatus, a user interface 712 (e.g., keypad, display, speaker, microphone, joystick) may also be provided. Of course, such a user interface 712 is optional, and may be omitted in some examples, such as a base station.

In some aspects of the disclosure, the processor 704 may include coding rate management circuitry 740 configured for various functions, including, for example, determining a plurality of block error rates associated with a channel between the wireless device 700 and a second device, the plurality of block error rates being associated with a plurality of coding rates. For example, the coding rate management circuitry 740 may be configured to implement one or more of the functions described below in relation to FIGS. 8-10, including, e.g., blocks 802, 902, and 1006.

In some aspects, the coding rate management circuitry 740 may be configured for various functions, including, for example, selecting a coding rate from the plurality of coding rates for forward error correction coding based on the plurality of block error rates and the plurality of coding rates. For example, the coding rate management circuitry 740 may be configured to implement one or more of the functions described below in relation to FIGS. 8-10, including, e.g., blocks 804, 908, and 1008.

In some aspects, the coding rate management circuitry 740 may be configured for various functions, including, for example, determining a plurality of optimal coding rates respectively for the plurality of channel quality values. For example, the coding rate management circuitry 740 may be configured to implement one or more of the functions described below in relation to FIG. 9, including, e.g., block 904.

In some aspects, the coding rate management circuitry 740 may be configured for various functions, including, for example, determining a channel quality value associated with the channel. For example, the coding rate management circuitry 740 may be configured to implement one or more of the functions described below in relation to FIG. 9, including, e.g., block 906.

In some aspects of the disclosure, the processor 704 may include Fountain code circuitry 742 configured for various functions with the encoding circuitry 720, including, for example, encoding a source data packet using a Fountain code of a plurality of Fountain codes to produce a codeword. For example, the Fountain code circuitry 742 may be configured to implement one or more of the functions described below in relation to FIGS. 8-10, including, e.g., blocks 806, 910, and 1010.

In some aspects of the disclosure, the processor 704 may include FEC circuitry 744 configured for various functions with the encoding circuitry 720, including, for example, performing the forward error correction coding on the codeword based on the selected coding rate to produce a transmit signal. For example, the FEC circuitry 744 may be configured to implement one or more of the functions described below in relation to FIGS. 8-10, including, e.g., blocks 808, 912, and 1012.

In some aspects of the disclosure, the processor 704 may include communication management circuitry 746 configured for various functions, including, for example, transmitting the transmit signal to the second device. For example, the communication management circuitry 746 may be configured to implement one or more of the functions described below in relation to FIGS. 8-10, including, e.g., blocks 810, 914, and 1014.

In some aspects, the communication management circuitry 746 may be configured for various functions, including, for example, transmitting, to a second device, a plurality of signals using each coding rate of the plurality of coding rates. For example, the communication management circuitry 746 may be configured to implement one or more of the functions described below in relation to FIG. 10, including, e.g., block 1002.

In some aspects, the communication management circuitry 746 may be configured for various functions, including, for example, receiving a plurality of feedback signals from the second device respectively in response to the plurality of transmitted signals for each coding rate of the plurality of coding rates. For example, the communication management circuitry 746 may be configured to implement one or more of the functions described below in relation to FIG. 10, including, e.g., block 1004.

The processor 704 is responsible for managing the bus 702 and general processing, including the execution of software stored on the computer-readable storage medium 706. The software, when executed by the processor 704, causes the processing system 714 to perform the various functions described below for any particular apparatus. The computer-readable storage medium 706 and the memory 705 may also be used for storing data that is manipulated by the processor 704 when executing software.

One or more processors 704 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 706. The computer-readable storage medium 706 may be a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 706 may reside in the processing system 714, external to the processing system 714, or distributed across multiple entities including the processing system 714. The computer-readable storage medium 706 may be embodied in a computer program product. By way of example, a computer program product may include a computer-readable storage medium in packaging materials. Those skilled in the art will recognize how best to implement the described functionality presented throughout this disclosure depending on the particular application and the overall design constraints imposed on the overall system.

In some aspects of the disclosure, the computer-readable storage medium 706 may include code rate management software/instructions 750 configured for various functions, including, for example, determining a plurality of block error rates associated with a channel between the wireless device 700 and a second device, the plurality of block error rates being associated with a plurality of coding rates. For example, the code rate management software/instructions 750 may be configured to implement one or more of the functions described below in relation to FIGS. 8-10, including, e.g., blocks 802, 902, and 1006.

In some aspects, the code rate management software/instructions 750 may be configured for various functions, including, for example, selecting a coding rate from the plurality of coding rates for forward error correction coding based on the plurality of block error rates and the plurality of coding rates. For example, the code rate management software/instructions 750 may be configured to implement one or more of the functions described below in relation to FIGS. 8-10, including, e.g., blocks 804, 908, and 1008.

In some aspects, the code rate management software/instructions 750 may be configured for various functions, including, for example, determining a plurality of optimal coding rates respectively for the plurality of channel quality values. For example, the code rate management software/instructions 750 may be configured to implement one or more of the functions described below in relation to FIG. 9, including, e.g., block 904.

In some aspects, the code rate management software/instructions 750 may be configured for various functions, including, for example, determining a channel quality value associated with the channel. For example, the code rate management software/instructions 750 may be configured to implement one or more of the functions described below in relation to FIG. 9, including, e.g., block 906.

In some aspects of the disclosure, the computer-readable storage medium 706 may include Fountain code software/instructions 752 configured for various functions with the encoding circuitry 720, including, for example, encoding a source data packet using a Fountain code of a plurality of Fountain codes to produce a codeword. For example, the Fountain code software/instructions 752 may be configured to implement one or more of the functions described below in relation to FIGS. 8-10, including, e.g., blocks 806, 910, and 1010.

In some aspects of the disclosure, the computer-readable storage medium 706 may include FEC software/instructions 754 configured for various functions with the encoding circuitry 720, including, for example, performing the forward error correction coding on the codeword based on the selected coding rate to produce a transmit signal. For example, the FEC software/instructions 754 may be configured to implement one or more of the functions described below in relation to FIGS. 8-10, including, e.g., blocks 808, 912, and 1012.

In some aspects of the disclosure, the computer-readable storage medium 706 may include communication management software/instructions 756 configured for various functions, including, for example, transmitting the transmit signal to the second device. For example, the communication management software/instructions 756 may be configured to implement one or more of the functions described below in relation to FIGS. 8-10, including, e.g., blocks 810, 914, and 1014.

In some aspects, the communication management software/instructions 756 may be configured for various functions, including, for example, transmitting, to a second device, a plurality of signals using each coding rate of the plurality of coding rates. For example, the communication management software/instructions 756 may be configured to implement one or more of the functions described below in relation to FIG. 10, including, e.g., block 1002.

In some aspects, the communication management software/instructions 756 may be configured for various functions, including, for example, receiving a plurality of feedback signals from the second device respectively in response to the plurality of transmitted signals for each coding rate of the plurality of coding rates. For example, the communication management software/instructions 756 may be configured to implement one or more of the functions described below in relation to FIG. 10, including, e.g., block 1004.

Figure 8:
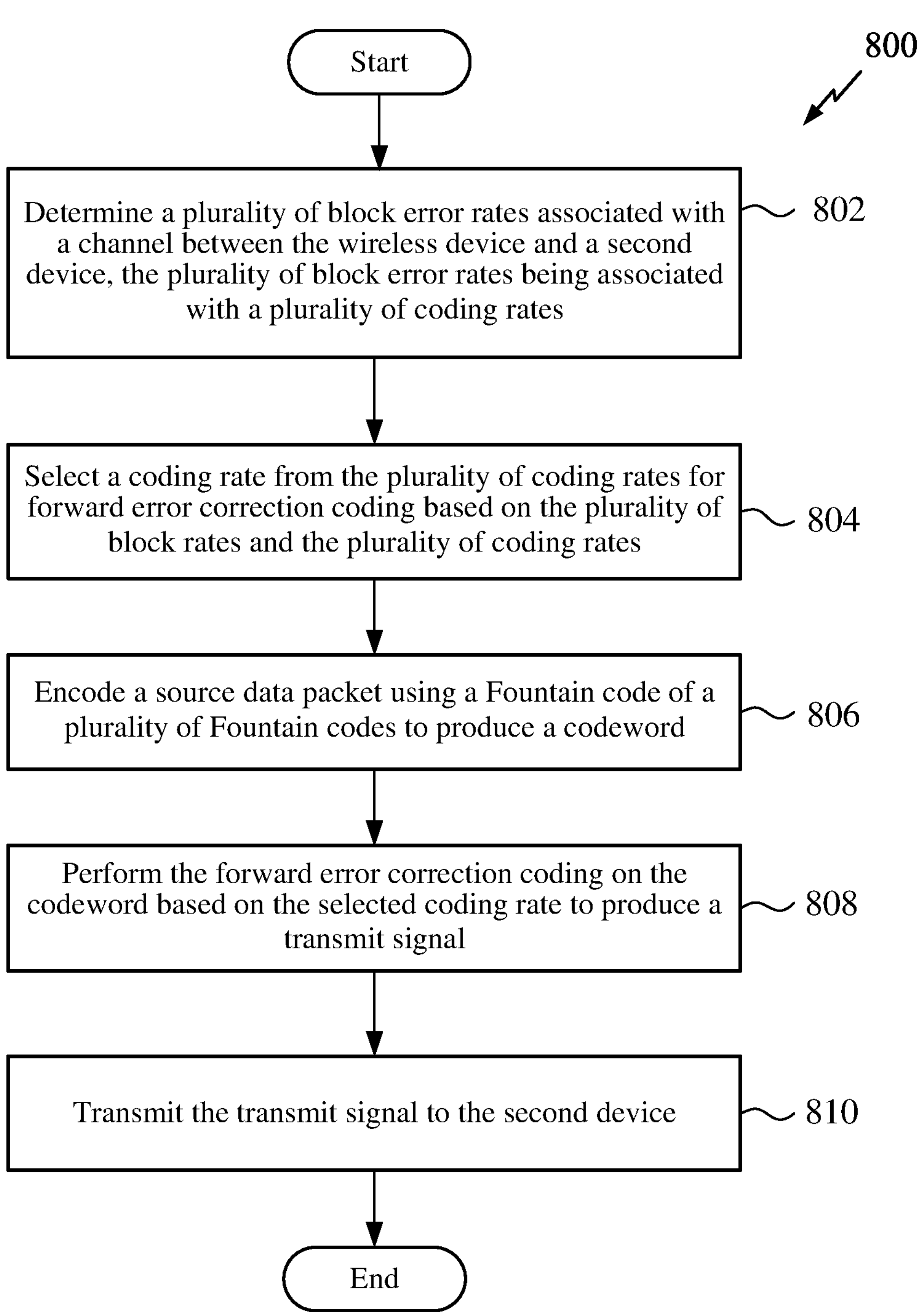
FIG. 8 is a flow chart of an exemplary method for wireless communication according to some aspects.

FIG. 8 is a flow chart illustrating an exemplary process 800 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 800 may be carried out by the wireless device 700 illustrated in FIG. 7. In some examples, the process 800 may be carried out by any suitable apparatus or means for carrying out the functions or algorithm described below.

At block 802, the wireless device 700 may determine a plurality of block error rates associated with a channel between the wireless device 700 and a second device, the plurality of block error rates being associated with a plurality of coding rates. For example, the coding rate management circuitry 740 shown and described above in connection with FIG. 7 may provide a means for determining the plurality of block error rates. In an aspect, the plurality of coding rates may be based on a plurality of modulation coding scheme (MCS) index values.

At block 804, the wireless device 700 may select a coding rate from the plurality of coding rates for forward error correction coding based on the plurality of block error rates and the plurality of coding rates. For example, the coding rate management circuitry 740 shown and described above in connection with FIG. 7 may provide a means for selecting the coding rate. In an aspect, the selecting the coding rate from the plurality of coding rates for the forward error correction coding at block 804 may include selecting the coding rate that maximizes a value of a metric based on a coding rate and a block error rate associated with the coding rate. In an aspect, the metric may be based on $(1-P_i)R_i$, where $R_i$ is an i-th coding rate of the plurality of coding rates and $P_i$ is an i-th block error rate of the plurality of block error rates that corresponds to the i-th coding rate $R_i$, and where i is an integer that ranges from 0 to M, M being a number of the plurality of coding rates.

At block 806, the wireless device 700 may encode a source data packet using a Fountain code of a plurality of Fountain codes to produce a codeword. For example, the Fountain code circuitry 742 along with the encoding circuitry 720 shown and described above in connection with FIG. 7 may provide a means for encoding the source data packet. In an aspect, the Fountain code may be a Raptor code.

At block 808, the wireless device 700 may perform the forward error correction coding on the codeword based on the selected coding rate to produce a transmit signal. For example, the FEC circuitry 744 along with the encoding circuitry 720 shown and described above in connection with FIG. 7 may provide a means for performing the forward error correction coding.

At block 810, the wireless device 700 may transmit the transmit signal to the second device. For example, the communication management circuitry 746 shown and described above in connection with FIG. 7 may provide a means for transmitting the transmit signal.

In one configuration, the wireless device 700 for wireless communication includes means for determining a plurality of block error rates associated with a channel between the wireless device 700 and a second device, the plurality of block error rates being associated with a plurality of coding rates, means for selecting a coding rate from the plurality of coding rates for forward error correction coding based on the plurality of block error rates and the plurality of coding rates, means for encoding a source data packet using a Fountain code of a plurality of Fountain codes to produce a codeword, means for performing the forward error correction coding on the codeword based on the selected coding rate to produce a transmit signal, and means for transmitting the transmit signal to the second device. In one aspect, the aforementioned means may be the processor(s) 704 and/or the encoding circuitry 720 shown in FIG. 7 configured to perform the functions recited by the aforementioned means. In another aspect, the aforementioned means may be a circuit or any apparatus configured to perform the functions recited by the aforementioned means.

Figure 9:
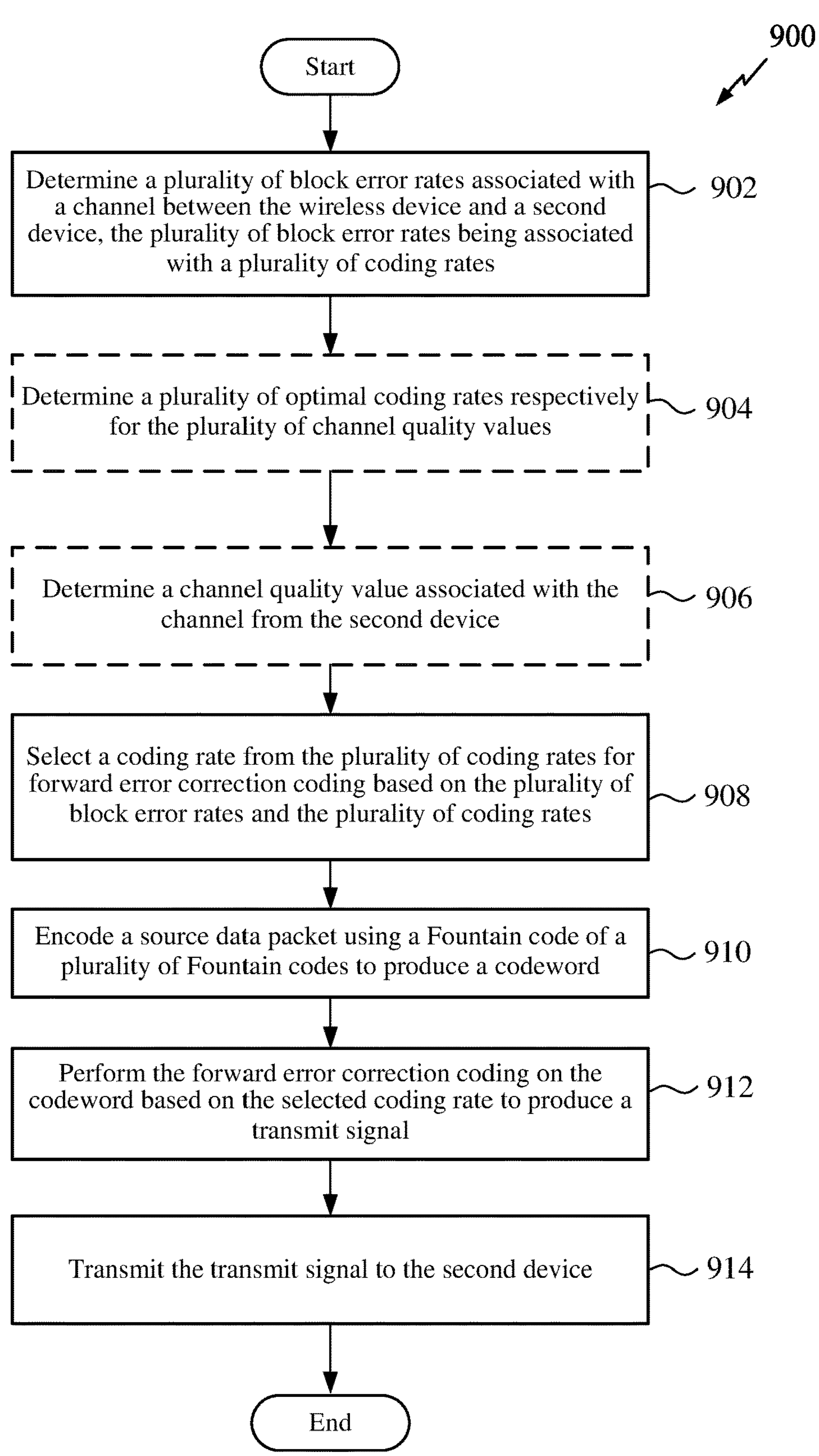
FIG. 9 is a flow chart of an exemplary method for wireless communication according to some aspects.

FIG. 9 is a flow chart illustrating an exemplary process 900 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 900 may be carried out by the wireless device 700 illustrated in FIG. 7. In some examples, the process 900 may be carried out by any suitable apparatus or means for carrying out the functions or algorithm described below.

At block 902, the wireless device 700 may determine a plurality of block error rates associated with a channel between the wireless device 700 and a second device, the plurality of block error rates being associated with a plurality of coding rates. For example, the coding rate management circuitry 740 shown and described above in connection with FIG. 7 may provide a means for determining the plurality of block error rates. In an aspect, the plurality of coding rates may be based on a plurality of modulation coding scheme (MCS) index values.

In an aspect, the determining the plurality of block error rates at block 902 may include receiving, from the second device, the plurality of block error rates determined based on the plurality of coding rates.

In an aspect, the determining the plurality of block error rates at block 902 may include determining a plurality of channel quality values associated with the channel for each coding rate of the plurality of coding rates. In an aspect, the determining the plurality of block error rates at block 902 may further include determining the plurality of block error rates that include a plurality of sets of block error rates, the plurality of sets respectively corresponding to the plurality of channel quality values, wherein block error rates of each set of the plurality of sets are respectively associated with a plurality of coding rates and are determined based respectively on the plurality of coding rates and a corresponding channel quality value of the plurality of channel quality values. In an aspect, the plurality of channel quality values may include at least one of a plurality of channel state information (CSI) feedback values or a plurality of signal-to-interference-plus-noise ratio (SINR) values.

At block 904, in an aspect, the wireless device 700 may determine a plurality of optimal coding rates respectively for the plurality of channel quality values. For example, the coding rate management circuitry 740 shown and described above in connection with FIG. 7 may provide a means for determining the plurality of optimal coding rates.

At block 906, in an aspect, the wireless device 700 may determine a channel quality value associated with the channel. For example, the coding rate management circuitry 740 shown and described above in connection with FIG. 7 may provide a means for receiving the channel quality value.

At block 908, the wireless device 700 may select a coding rate from the plurality of coding rates for forward error correction coding based on the plurality of block error rates and the plurality of coding rates. For example, the coding rate management circuitry 740 shown and described above in connection with FIG. 7 may provide a means for selecting the coding rate. In an aspect, the selecting the coding rate from the plurality of coding rates for the forward error correction coding at block 904 may include selecting the coding rate that maximizes a value of a metric based on a coding rate and a block error rate associated with the coding rate. In an aspect, the metric may be based on $(1-P_i)R_i$, where $R_i$ is an i-th coding rate of the plurality of coding rates and $P_i$ is an i-th block error rate of the plurality of block error rates that corresponds to the i-th coding rate $R_i$, and where i is an integer that ranges from 0 to M, M being a number of the plurality of coding rates.

In an aspect, the selecting the coding rate at block 908 may include selecting one of the plurality optimal coding rates that corresponds with the determined channel quality value.

In an aspect, the selecting the coding rate from the plurality of coding rates at block 908 may be further based on the plurality of channel quality values.

At block 910, the wireless device 700 may encode a source data packet using a Fountain code of a plurality of Fountain codes to produce a codeword. For example, the Fountain code circuitry 742 along with the encoding circuitry 720 shown and described above in connection with FIG. 7 may provide a means for encoding the source data packet. In an aspect, the Fountain code may be a Raptor code.

At block 912, the wireless device 700 may perform the forward error correction coding on the codeword based on the selected coding rate to produce a transmit signal. For example, the FEC circuitry 744 along with the encoding circuitry 720 shown and described above in connection with FIG. 7 may provide a means for performing the forward error correction coding.

At block 914, the wireless device 700 may transmit the transmit signal to the second device. For example, the communication management circuitry 746 shown and described above in connection with FIG. 7 may provide a means for transmitting the transmit signal.

In one configuration, the wireless device 700 for wireless communication includes means for determining a plurality of block error rates associated with a channel between the wireless device 700 and a second device, the plurality of block error rates being associated with a plurality of coding rates, means for selecting a coding rate from the plurality of coding rates for forward error correction coding based on the plurality of block error rates and the plurality of coding rates, means for encoding a source data packet using a Fountain code of a plurality of Fountain codes to produce a codeword, means for performing the forward error correction coding on the codeword based on the selected coding rate to produce a transmit signal, and means for transmitting the transmit signal to the second device. In an aspect, the wireless device 700 may further include means for determining a plurality of optimal coding rates respectively for the plurality of channel quality values, and means for determining a channel quality value associated with the channel. In one aspect, the aforementioned means may be the processor(s) 704 and/or the encoding circuitry 720 shown in FIG. 7 configured to perform the functions recited by the aforementioned means. In another aspect, the aforementioned means may be a circuit or any apparatus configured to perform the functions recited by the aforementioned means.

Figure 10:
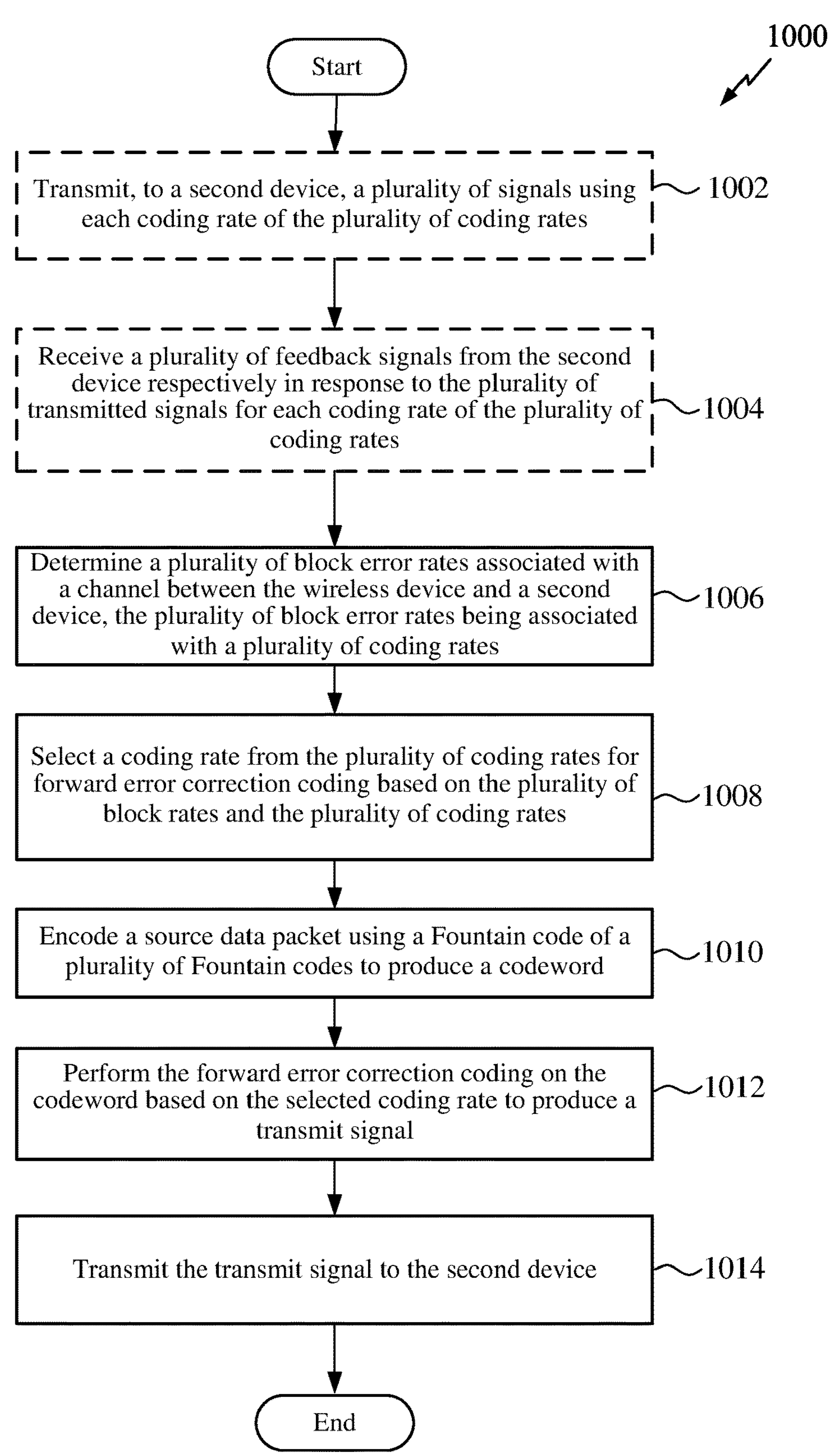
FIG. 10 is a flow chart of an exemplary method for wireless communication according to some aspects.

FIG. 10 is a flow chart illustrating an exemplary process 1000 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 1000 may be carried out by the wireless device 700 illustrated in FIG. 7. In some examples, the process 1000 may be carried out by any suitable apparatus or means for carrying out the functions or algorithm described below.

At block 1002, in an aspect, the wireless device 700 may transmit, to a second device, a plurality of signals using each coding rate of the plurality of coding rates. For example, the communication management circuitry 746 shown and described above in connection with FIG. 7 may provide a means for transmitting the plurality of signals.

At block 1004, in an aspect, the wireless device 700 may receive a plurality of feedback signals from the second device respectively in response to the plurality of transmitted signals for each coding rate of the plurality of coding rates. For example, the communication management circuitry 746 shown and described above in connection with FIG. 7 may provide a means for receiving the plurality of feedback signals.

At block 1006, the wireless device 700 may determine a plurality of block error rates associated with a channel between the wireless device 700 and a second device, the plurality of block error rates being associated with a plurality of coding rates. For example, the coding rate management circuitry 740 shown and described above in connection with FIG. 7 may provide a means for determining the plurality of block error rates. In an aspect, the plurality of coding rates may be based on a plurality of modulation coding scheme (MCS) index values.

In an aspect, the determining the plurality of block error rates at block 1006 may include determining each block error rate for a corresponding coding rate of the plurality of coding rates based on the plurality of feedback signals for the corresponding coding rate of the plurality of coding rates. In an aspect, each of the plurality of feedback signals may indicate either an acknowledgement (ACK) or a negative acknowledgement (NACK).

At block 1008, the wireless device 700 may select a coding rate from the plurality of coding rates for forward error correction coding based on the plurality of block error rates and the plurality of coding rates. For example, the coding rate management circuitry 740 shown and described above in connection with FIG. 7 may provide a means for selecting the coding rate. In an aspect, the selecting the coding rate from the plurality of coding rates for the forward error correction coding at block 1004 may include selecting the coding rate that maximizes a value of a metric based on a coding rate and a block error rate associated with the coding rate. In an aspect, the metric may be based on $(1-P_i)R_i$, where $R_i$ is an i-th coding rate of the plurality of coding rates and $P_i$ is an i-th block error rate of the plurality of block error rates that corresponds to the i-th coding rate $R_i$, and where i is an integer that ranges from 0 to M, M being a number of the plurality of coding rates.

At block 1010, the wireless device 700 may encode a source data packet using a Fountain code of a plurality of Fountain codes to produce a codeword. For example, the Fountain code circuitry 742 along with the encoding circuitry 720 shown and described above in connection with FIG. 7 may provide a means for encoding the source data packet. In an aspect, the Fountain code may be a Raptor code.

At block 1012, the wireless device 700 may perform the forward error correction coding on the codeword based on the selected coding rate to produce a transmit signal. For example, the FEC circuitry 744 along with the encoding circuitry 720 shown and described above in connection with FIG. 7 may provide a means for performing the forward error correction coding.

At block 1014, the wireless device 700 may transmit the transmit signal to the second device. For example, the communication management circuitry 746 shown and described above in connection with FIG. 7 may provide a means for transmitting the transmit signal.

In one configuration, the wireless device 700 for wireless communication includes means for determining a plurality of block error rates associated with a channel between the wireless device 700 and a second device, the plurality of block error rates being associated with a plurality of coding rates, means for selecting a coding rate from the plurality of coding rates for forward error correction coding based on the plurality of block error rates and the plurality of coding rates, means for encoding a source data packet using a Fountain code of a plurality of Fountain codes to produce a codeword, means for performing the forward error correction coding on the codeword based on the selected coding rate to produce a transmit signal, and means for transmitting the transmit signal to the second device. In an aspect, the wireless device 700 may further include means for transmitting, to the second device, a plurality of signals using each coding rate of the plurality of coding rates, and means for receiving a plurality of feedback signals from the second device respectively in response to the plurality of transmitted signals for each coding rate of the plurality of coding rates. In one aspect, the aforementioned means may be the processor(s) 704 and/or the encoding circuitry 720 shown in FIG. 7 configured to perform the functions recited by the aforementioned means. In another aspect, the aforementioned means may be a circuit or any apparatus configured to perform the functions recited by the aforementioned means.

Of course, in the above examples, the circuitry included in the processor 704 and the encoding circuitry 720 is merely provided as an example, and other means for carrying out the described functions may be included within various aspects of the present disclosure, including but not limited to the instructions stored in the computer-readable storage medium 706, or any other suitable apparatus or means described in any one of the FIGS. 1, 4, and/or 6, and utilizing, for example, the processes and/or algorithms described herein in relation to FIGS. 8, 9 and/or 10.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-10 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 4, 6, and/or 7 may be configured to perform one or more of the methods, features, or steps described herein. The novel algorithms described herein may also be efficiently implemented in software and/or embedded in hardware.

The following provides an overview of several aspects of the present disclosure.

Aspect 1: A method of wireless communication by a wireless device, comprising: determining a plurality of block error rates associated with a channel between the wireless device and a second device, the plurality of block error rates being associated with a plurality of coding rates; selecting a coding rate from the plurality of coding rates for forward error correction coding based on the plurality of block rates and the plurality of coding rates; encoding a source data packet using a Fountain code of a plurality of Fountain codes to produce a codeword; performing the forward error correction coding on the codeword based on the selected coding rate to produce a transmit signal; and transmitting the transmit signal to the second device.

Aspect 2: The method of aspect 1, wherein the determining the plurality of block error rates comprises: receiving, from the second device, the plurality of block error rates determined based on the plurality of coding rates.

Aspect 3: The method of aspect 1, wherein the determining the plurality of block error rates comprises determining a plurality of channel quality values associated with the channel for each coding rate of the plurality of coding rates, and wherein the selecting the coding rate from the plurality of coding rates is further based on the plurality of channel quality values.

Aspect 4: The method of aspect 3, wherein the determining the plurality of block error rates comprises further comprises: determining the plurality of block error rates that include a plurality of sets of block error rates, the plurality of sets respectively corresponding to the plurality of channel quality values, wherein block error rates of each set of the plurality of sets are respectively associated with a plurality of coding rates and are determined based respectively on the plurality of coding rates and a corresponding channel quality value of the plurality of channel quality values.

Aspect 5: The method of aspect 3 or 4, further comprising: determining a plurality of optimal coding rates respectively for the plurality of channel quality values; and receiving a channel quality value associated with the channel from the second device, wherein the selecting the coding rate comprises selecting one of the plurality optimal coding rates that corresponds with the channel quality value received from the second device.

Aspect 6: The method of any of aspects 3-5, wherein the plurality of channel quality values include at least one of a plurality of channel state information (CSI) feedback values or a plurality of signal-to-interference-plus-noise ratio (SINR) values.

Aspect 7: The method of aspect 1, further comprising: transmitting, to a second device, a plurality of signals using each coding rate of the plurality of coding rates; receiving a plurality of feedback signals from the second device respectively in response to the plurality of transmitted signals for each coding rate of the plurality of coding rates, wherein the determining the plurality of block error rates comprises determining each block error rate for a corresponding coding rate of the plurality of coding rates based on the plurality of feedback signals for the corresponding coding rate of the plurality of coding rates.

Aspect 8: The method of aspect 7, wherein each of the plurality of feedback signals indicates either an acknowledgement (ACK) or a negative acknowledgement (NACK).

Aspect 9: The method of any of aspects 1-8, wherein the selecting the coding rate from the plurality of coding rates for the forward error correction coding comprises selecting the coding rate that maximizes a value of a metric based on a coding rate and a block error rate associated with the coding rate.

Aspect 10: The method of aspect 9, wherein the metric is based on $(1-P_i)R_i$, wherein $R_i$ is an i-th coding rate of the plurality of coding rates and $P_i$ is an i-th block error rate of the plurality of block error rates that corresponds to the i-th coding rate $R_i$, and wherein i is an integer that ranges from 0 to M, M being a number of the plurality of coding rates.

Aspect 11: The method of any of aspects 1-10, wherein the plurality of coding rates are based on a plurality of modulation coding scheme (MCS) index values.

Aspect 12: The method of any of aspects 1-11, wherein the Fountain code is a Raptor code.

Aspect 13: A wireless device comprising: a transceiver configured to communicate with a radio access network, a memory, and a processor communicatively coupled to the transceiver and the memory, wherein the processor and the memory are configured to perform any one of aspects 1 through 12.

Aspect 14: A wireless device configured for wireless communication comprising at least one means for performing any one of aspects 1 through 12.

Aspect 15: A non-transitory computer-readable storage medium having instructions for a wireless device thereon, wherein the instructions, when executed by a processing circuit, cause the processing circuit to perform any one of aspects 1 through 12.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method of wireless communication by a wireless device, comprising:

determining a plurality of block error rates associated with a channel between the wireless device and a second wireless device, the plurality of block error rates being associated with a plurality of coding rates;

determining a plurality of optimal coding rates respectively for a plurality of channel quality values based on the plurality of block error rates and the plurality of coding rates, each optimal coding rate of the plurality of optimal coding rates being an optimal coding rate among the plurality of coding rates for a respective channel quality value of the plurality of channel quality values;

determining a channel quality value associated with the channel, from the plurality of channel quality values;

selecting a coding rate from the plurality of coding rates for forward error correction coding based on the plurality of block error rates and the plurality of coding rates, wherein each of the plurality of coding rates corresponds to respective one or more of the plurality of block error rates, wherein the selected coding rate is one of the plurality of optimal coding rates that corresponds with the determined channel quality value;

encoding a source data packet using a Fountain code of a plurality of Fountain codes to produce a codeword;

performing the forward error correction coding on the codeword based on the selected coding rate to produce a transmit signal; and transmitting the transmit signal to the second wireless device.

2. The method of claim 1, wherein the determining the plurality of block error rates comprises:

receiving, from the second wireless device, the plurality of block error rates determined based on the plurality of coding rates.

3. The method of claim 1, wherein the determining the plurality of block error rates comprises determining the plurality of channel quality values associated with the channel for each coding rate of the plurality of coding rates, and wherein the selecting the coding rate from the plurality of coding rates is further based on the plurality of channel quality values.

4. The method of claim 3, wherein the determining the plurality of block error rates comprises:

determining the plurality of block error rates that include a plurality of sets of block error rates, the plurality of sets respectively corresponding to the plurality of coding rates, wherein block error rates of each set of the plurality of sets are associated with a respective coding rate of the plurality of coding rates, are respectively associated with the plurality of channel quality values, and are determined based on the respective coding rate of the plurality of coding rates and the plurality of channel quality values.

5. The method of claim 1, wherein the plurality of channel quality values include at least one of a plurality of channel state information (CSI) feedback values or a plurality of signal-to-interference-plus-noise ratio (SINR) values.

6. The method of claim 1, further comprising:

transmitting, to the second wireless device, a plurality of signals using each coding rate of the plurality of coding rates;

receiving a plurality of feedback signals from the second wireless device respectively in response to the plurality of transmitted signals for each coding rate of the plurality of coding rates, wherein the determining the plurality of block error rates comprises determining each block error rate for a corresponding coding rate of the plurality of coding rates based on the plurality of feedback signals for the corresponding coding rate of the plurality of coding rates.

7. The method of claim 6, wherein each of the plurality of feedback signals indicates either an acknowledgement (ACK) or a negative acknowledgement (NACK).

8. The method of claim 1, wherein the selecting the coding rate from the plurality of coding rates for the forward error correction coding comprises selecting the coding rate that maximizes a value of a metric based on a coding rate and a block error rate associated with the coding rate.

9. The method of claim 8, wherein the metric is based on $(1-P_i)R_i$, wherein $R_i$ is an i-th coding rate of the plurality of coding rates and $P_i$ is an i-th block error rate of the plurality of block error rates that corresponds to the i-th coding rate $R_i$, and wherein i is an integer that ranges from 0 to M, M being a number of the plurality of coding rates.

10. The method of claim 1, wherein the plurality of coding rates are based on a plurality of modulation coding scheme (MCS) index values.

11. The method of claim 1, wherein the Fountain code is a Raptor code.

12. A wireless device for wireless communication, comprising:

at least one processor;

a transceiver communicatively coupled to the at least one processor; and a memory communicatively coupled to the at least one processor, wherein the at least one processor is configured to:

determine a plurality of block error rates associated with a channel between the wireless device and a second wireless device, the plurality of block error rates being associated with a plurality of coding rates;

determine a plurality of optimal coding rates respectively for a plurality of channel quality values based on the plurality of block error rates and the plurality of coding rates, each optimal coding rate of the plurality of optimal coding rates being an optimal coding rate among the plurality of coding rates for a respective channel quality value of the plurality of channel quality values;

determine a channel quality value associated with the channel, from the plurality of channel quality values;

select a coding rate from the plurality of coding rates for forward error correction coding based on the plurality of block error rates and the plurality of coding rates, wherein each of the plurality of coding rates corresponds to respective one or more of the plurality of block error rates, wherein the selected coding rate is one of the plurality of optimal coding rates that corresponds with the determined channel quality value;

encode a source data packet using a Fountain code of a plurality of Fountain codes to produce a codeword;

perform the forward error correction coding on the codeword based on the selected coding rate to produce a transmit signal; and transmit the transmit signal to the second wireless device.

13. The wireless device of claim 12, wherein the at least one processor configured to determine the plurality of block error rates is configured to:

receive, from the second wireless device, the plurality of block error rates determined based on the plurality of coding rates.

14. The wireless device of claim 12, wherein the at least one processor configured to determine the plurality of block error rates is configured to determine the plurality of channel quality values associated with the channel for each coding rate of the plurality of coding rates, and wherein the coding rate from the plurality of coding rates is selected further based on the plurality of channel quality values.

15. The wireless device of claim 14, wherein the at least one processor configured to determine the plurality of block error rates is configured to:

determine the plurality of block error rates that include a plurality of sets of block error rates, the plurality of sets respectively corresponding to the plurality of coding rates, wherein block error rates of each set of the plurality of sets are associated with a respective coding rate of the plurality of coding rates, are respectively associated with a plurality of channel quality values, and are determined based on the respective coding rate of the plurality of coding rates and the plurality of channel quality values.

16. The wireless device of claim 12, wherein the plurality of channel quality values include at least one of a plurality of channel state information (CSI) feedback values or a plurality of signal-to-interference-plus-noise ratio (SINR) values.

17. The wireless device of claim 12, wherein the at least one processor is further configured to:

transmit, to the second wireless device, a plurality of signals using each coding rate of the plurality of coding rates;

receive a plurality of feedback signals from the second wireless device respectively in response to the plurality of transmitted signals for each coding rate of the plurality of coding rates, wherein the at least one processor configured to determine the plurality of block error rates is configured to determine each block error rate for a corresponding coding rate of the plurality of coding rates based on the plurality of feedback signals for the corresponding coding rate of the plurality of coding rates.

18. The wireless device of claim 12, wherein the at least one processor configured to select the coding rate from the plurality of coding rates for the forward error correction coding is configured to select the coding rate that maximizes a value of a metric based on a coding rate and a block error rate associated with the coding rate.

19. The wireless device of claim 18, wherein the metric is based on $(1-P_i)\,R_i$, wherein $R_i$ is an i-th coding rate of the plurality of coding rates and $P_i$ is an i-th block error rate of the plurality of block error rates that corresponds to the i-th coding rate $R_i$, and wherein i is an integer that ranges from 0 to M, M being a number of the plurality of coding rates.

20. A wireless device for wireless communication, comprising:

at least one processor;

a transceiver communicatively coupled to the at least one processor; and a memory communicatively coupled to the at least one processor, wherein the at least one processor is configured to:

transmit, to a second wireless device, a plurality of signals using each coding rate of a plurality of coding rates;

receive a plurality of feedback signals, respectively corresponding to the plurality of transmitted signals, from the second wireless device in response to the plurality of transmitted signals for each coding rate of the plurality of coding rates;

determine a plurality of block error rates associated with a channel between the wireless device and the second wireless device, the plurality of block error rates being associated with the plurality of coding rates, wherein the at least one processor configured to determine the plurality of block error rates is configured to determine each block error rate of the plurality of block error rates for a corresponding coding rate of the plurality of coding rates based on the plurality of feedback signals for the corresponding coding rate of the plurality of coding rates;

select a coding rate from the plurality of coding rates for forward error correction coding based on the plurality of block error rates and the plurality of coding rates, wherein each of the plurality of coding rates corresponds to respective one or more of the plurality of block error rates;

encode a source data packet using a Fountain code of a plurality of Fountain codes to produce a codeword;

perform the forward error correction coding on the codeword based on the selected coding rate to produce a transmit signal; and transmit the transmit signal to the second wireless device.

21. The wireless device of claim 20, wherein the at least one processor configured to determine the plurality of block error rates is configured to:

receive, from the second wireless device, the plurality of block error rates determined based on the plurality of coding rates.

22. The wireless device of claim 20, wherein the at least one processor configured to determine the plurality of block error rates is configured to determine a plurality of channel quality values associated with the channel for each coding rate of the plurality of coding rates, and wherein the at least one processor configured to select the coding rate is configured to select the coding rate from the plurality of coding rates further based on the plurality of channel quality values.

23. The wireless device of claim 22, wherein the at least one processor configured to determine the plurality of block error rates is configured to:

determine the plurality of block error rates that include a plurality of sets of block error rates, the plurality of sets respectively corresponding to the plurality of coding rates, wherein block error rates of each set of the plurality of sets are associated with a respective coding rate of the plurality of coding rates, are respectively associated with the plurality of channel quality values, and are determined based on the respective coding rate of the plurality of coding rates and the plurality of channel quality values.

24. The wireless device of claim 22, wherein the at least one processor is further configured to:

determine a plurality of optimal coding rates respectively for the plurality of channel quality values; and determine a channel quality value associated with the channel, wherein the at least one processor configured to select the coding rate is configured to select one of the plurality of optimal coding rates that corresponds with the determined channel quality value.

25. The wireless device of claim 20, wherein the at least one processor configured to select the coding rate from the plurality of coding rates for the forward error correction coding is configured to select the coding rate that maximizes a value of a metric based on a coding rate and a block error rate associated with the coding rate.

26. The wireless device of claim 25, wherein the metric is based on $(1-P_i)\ R_i$, wherein $R_i$ is an i-th coding rate of the plurality of coding rates and $P_i$ is an i-th block error rate of the plurality of block error rates that corresponds to the i-th coding rate $R_i$, and wherein i is an integer that ranges from 0 to M, M being a number of the plurality of coding rates.

27. A method of wireless communication by a wireless device, comprising:

transmitting, to a second wireless device, a plurality of signals using each coding rate of a plurality of coding rates;

receiving a plurality of feedback signals, respectively corresponding to the plurality of transmitted signals, from the second wireless device in response to the plurality of transmitted signals for each coding rate of the plurality of coding rates;

determining a plurality of block error rates associated with a channel between the wireless device and the second wireless device, the plurality of block error rates being associated with the plurality of coding rates, wherein the determining the plurality of block error rates comprises determining each block error rate of the plurality of block error rates for a corresponding coding rate of the plurality of coding rates based on the plurality of feedback signals for the corresponding coding rate of the plurality of coding rates;

selecting a coding rate from the plurality of coding rates for forward error correction coding based on the plurality of block error rates and the plurality of coding rates, wherein each of the plurality of coding rates corresponds to respective one or more of the plurality of block error rates;

encoding a source data packet using a Fountain code of a plurality of Fountain codes to produce a codeword;

performing the forward error correction coding on the codeword based on the selected coding rate to produce a transmit signal; and transmitting the transmit signal to the second wireless device.

* * * * *